J. T. LISTER.
TIRE FORMING MATERIAL.
APPLICATION FILED MAY 6, 1914.
1,147,253.
Patented July 20, 1915.
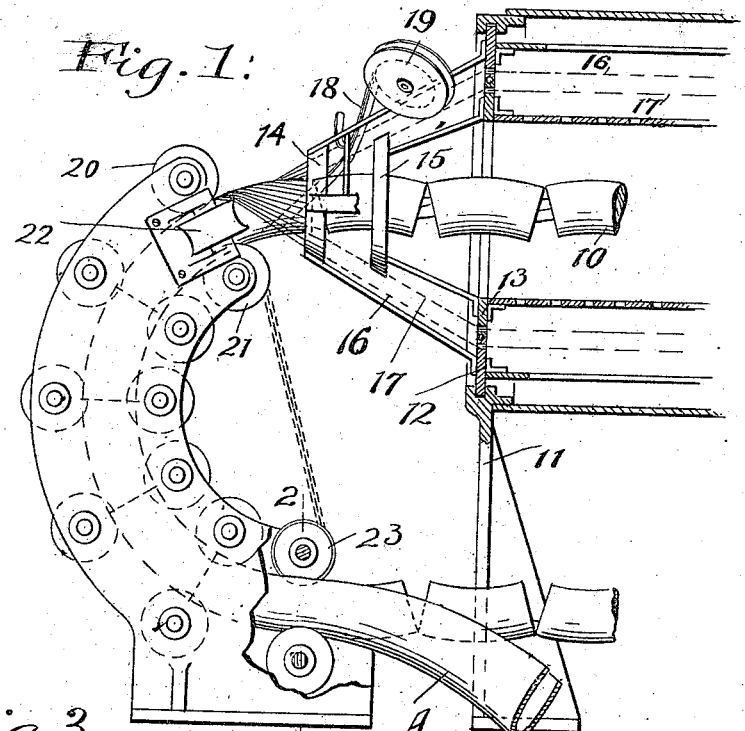
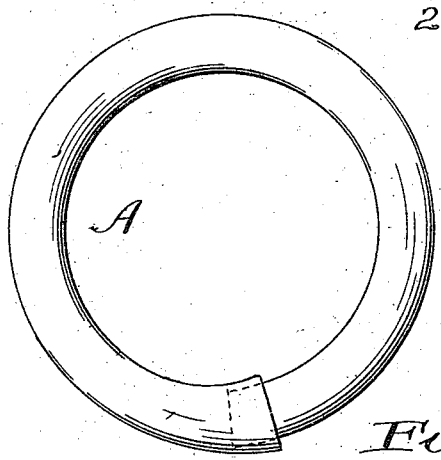
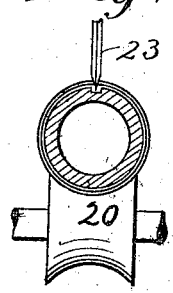
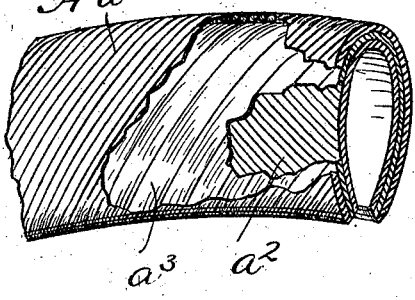
Witnesses.
E. B. Gilchrist
L. I. Porter
Inventor.
John T. Lister
by Thurston & Knox
attys.

UNITED STATES PATENT OFFICE.

JOHN T. LISTER, OF CLEVELAND, OHIO.

TIRE-FORMING MATERIAL.

1,147,253. Specification of Letters Patent. Patented July 20, 1915.

Application filed May 6, 1914. Serial No. 836,602.

*To all whom it may concern:*

Be it known that I, JOHN T. LISTER, a citizen of the United States, residing at Cleveland, in the county of Cuyahoga and State of Ohio, have invented a certain new and useful Improvement in Tire-Forming Material, of which the following is a full, clear, and exact description.

This invention relates to tire forming material and has for its chief object to provide tire forming material which will enable tires to be formed more quickly and cheaply than at the present time, and which will result in the production of tires which are better or have longer life than the majority of tires now manufactured.

More specifically, the invention aims to provide a tire forming strip or tire forming material which when applied to the core of a tire forming machine will naturally conform to the shape thereof, so that the formation of wrinkles at the inner periphery of the core and the necessity for stretching the fabric or strip at and adjacent the outer periphery thereof, will be eliminated. In other words, when the strip is applied to the core, no part will be under greater stress than any other part.

The subject matter of this invention is substantially the product of the machine and method forming the subject matter of my prior application, Serial No. 752,580, filed March 7th, 1913.

In the accompanying sheet of drawings, wherein I have shown the preferred embodiment of my invention and a part of the apparatus by which that embodiment may be constructed, Figure 1 is a side view, with parts in section, of one end of the machine by which the tire forming strip or tire forming fabric may be made; Fig. 2 is a sectional view substantially along the line 2—2 of Fig. 1; Fig. 3 is a side view of a section of the tire forming strip or fabric; and Fig. 4 is an enlarged perspective view of a portion of the strip, portions being broken away.

Aside from the particular structure or texture of the strip or tire forming material constituting the subject matter of this invention, the chief feature is its shape or contour, or its inherent tendency to assume or conform to the shape of the core of a tire forming machine. This feature or characteristic is obtained by forming the strip into tubular shape on a circular or semi-circular core of the same diameter as the core of a tire making machine, and subsequently splitting or cutting the tube on its inner periphery.

While the present invention does not involve any particular machine for forming the product, in Figs. 1 and 2, I have illustrated the principal part of a machine which may be utilized for the manufacture of the product or tire forming strip constituting this invention.

An illustration and description of the complete machine is believed to be unnecessary, and for a complete understanding of the same, reference is had to my prior application previously referred to.

The tire forming strip designated A is made in indeterminate length, as illustrated in Fig. 1, but in Fig. 3 there is shown a section of the strip, whose length is substantially that required to once encircle the core of a tire making machine. Preferably, this strip is formed of two layers $a'$ and $a^2$ of spirally wound rubberized cords or threads, with the cords of one layer at an angle to the cords of the other layer, and an intermediate layer $a^3$ of rubber formed by a spirally wound strip.

The strip is preferably formed in a machine having a traveling core composed of an endless chain of segment-shaped sections 10, each circular in cross section. These parts are so arranged and are of such size that at the ends of the machine, the sections arrange themselves into semi-circular formation. That is, at each end of the chain of core sections, a certain number of sections are arranged end to end, so as to form a more or less rigid semi-circular core, the cross-sectional shape and diameter of which is the same as the cross sectional shape and diameter of the core of the tire forming machine with which the strips are subsequently employed. The machine also includes a frame 11 which supports two concentric rotary drums 12 and 13 which are rotated in opposite directions. Supported from the ends of these drums are two circular winders 14 and 15, through which the sections 10 of the core pass. Two groups of rubberized cords or threads 16 and 17 are carried by the drums 12 and 13 respectively, and pass from the ends thereof diagonally inwardly toward the core, and through openings in the winders 14 and 15, and thence onto the core, one group of cords or threads engaging the core in advance of the other. These threads are wound onto the semi-circular part of the traveling core, in such a manner as to form two layers $a'$ and $a^2$, with the cords or threads of one layer wound spirally in one direction, and cords or threads of the other layer wound spirally in the other direction. I prefer also to place between the two layers of threads or cords, a layer of rubber $a^3$ formed from a strip wound spirally on the inner layer or between the two layers of threads. In this case, this layer of rubber is formed from a strip 18 which is supplied onto the traveling endless core from a reel 19 which rotates with the outer drum 12.

After the threads and the strip of rubber are applied onto the core, so as to form the three superimposed closely adhering layers, the latter are compressed by rotary compressors 20, 21 and 22, which engage the inner, outer and side portions of the periphery of the core or of the outer layer of the tube formed in the manner stated. About 180° from the point at which the materials forming the tube are wound onto the core, that is at the terminus of the semi-circular part of the core, there is arranged a cutter 23 which cuts the tube on its inner periphery. There is thus formed an open tube which can be conducted at once to the core of a tire forming machine, or can be wound upon a reel for subsequent use in such a machine.

Inasmuch as the strip is formed on a core which is circular in cross section transversely and also circular lengthwise of the strip, the strip not only has an inherent tendency to assume the tubular shape, but it has, as well, a tendency to assume a circular shape lengthwise thereof, as shown in Fig. 3. In consequence, when a strip of this character is applied to the core of the tire forming machine whose diameter is equal substantially to the diameter of that part of the core of the machine which is utilized in the manufacture of the strip, the said strip will conform to the shape of the core, with practically no wrinkling of the material at the inner periphery of the core, and with little or no stretching of the material at the outer periphery. This permits the tires to be formed much more quickly and cheaply than at the present time, and the fact that all parts of the strip are under the same stress or tension when the strip is applied to the core of the tire forming machine enables more durable and efficient tires to be made.

In Fig. 4, the thickness of the tire forming strip and of the individual layers thereof is considerably exaggerated, for the sake of clearness.

Having thus described my invention, what I claim is:

1. A tire forming strip adapted to be applied to the circular core of a tire forming machine, said strip having an inherent tendency to conform substantially to the cross sectional and circumferential shape of the core when applied thereto.

2. As an article of manufacture, a tire forming strip adapted to be applied to the circular core of a tire forming machine and comprising a layer of spirally wound material, said strip having an inherent tendency to conform substantially to the cross sectional and circular shape of the core when applied thereto.

3. As an article of manufacture, a tire forming strip adapted to be applied to the circular core of a tire forming machine, said strip being composed of a plurality of closely adhering layers and having an inherent tendency to conform substantially to the cross sectional and circular shape of the core when applied thereto.

4. As an article of manufacture, a tire forming strip adapted to be applied to the circular core of a tire forming machine, said strip comprising a plurality of layers formed of spirally wound tire forming material with the material of one layer at an angle to the material of an adjacent layer and said strip having an inherent tendency to conform substantially to the cross sectional and circular shape of the core when applied thereto.

5. As an article of manufacture, a tire forming strip adapted to be applied to the circular core of a tire forming machine, said strip having an inherent tendency to conform substantially to the cross sectional and circular shape of the core when applied thereto, and composed of a plurality of layers of strip forming material and an intervening layer of rubber.

6. As an article of manufacture, a tire forming strip adapted to be applied to the circular core of a tire forming machine, said strip having an inherent tendency to conform substantially to the cross sectional and circular shape of the core when applied thereto, and comprising two layers of strip forming material wound spirally in opposite directions, and an intermediate layer of rubber.

7. A tire forming strip adapted to be applied to the circular core of a tire forming machine, said strip having an inherent tendency to conform substantially to the cross-sectional and circumferential shape of the core when applied thereto, and comprising a layer of closely adhering adhesive cords extending from one edge of the strip to the other.

8. A tire forming strip adapted to be applied to the circular core of a tire forming machine, said strip having an inherent tendency to conform substantially to the cross-sectional and circumferential shape of the core when applied thereto, and comprising two layers of rubberized cords with the cords of one layer at an angle to the cords of the other layer.

In testimony whereof, I hereunto affix my signature in the presence of two witnesses.

JOHN T. LISTER.

Witnesses:
A. F. KWIS,
L. I. PORTER.

Copies of this patent may be obtained for five cents each, by addressing the "Commissioner of Patents, Washington, D. C."